United States Patent
Weber

(10) Patent No.: US 9,777,608 B2
(45) Date of Patent: Oct. 3, 2017

(54) BLOW-BY DEVICE

(71) Applicant: DBK David + Baader GmbH, Rulzheim (DE)

(72) Inventor: Thomas Weber, Kuhardt (DE)

(73) Assignee: DBK David + Baader GmbH, Ruelzheim (DE)

( * ) Notice: Subject to any disclaimer, the term of this patent is extended or adjusted under 35 U.S.C. 154(b) by 162 days.

(21) Appl. No.: 14/890,178

(22) PCT Filed: May 16, 2014

(86) PCT No.: PCT/EP2014/060050
§ 371 (c)(1),
(2) Date: Nov. 10, 2015

(87) PCT Pub. No.: WO2014/184333
PCT Pub. Date: Nov. 20, 2014

(65) Prior Publication Data
US 2016/0169069 A1    Jun. 16, 2016

(30) Foreign Application Priority Data
May 17, 2013   (DE) .................. 10 2013 105 131

(51) Int. Cl.
| | |
|---|---|
| *F01M 13/04* | (2006.01) |
| *F01M 13/00* | (2006.01) |
| *H01R 13/00* | (2006.01) |
| *F16L 25/01* | (2006.01) |
| *F16L 53/00* | (2006.01) |

(Continued)

(52) U.S. Cl.
CPC ............ *F01M 13/04* (2013.01); *F01M 13/00* (2013.01); *F16L 25/01* (2013.01); *F16L 53/008* (2013.01); *H01R 13/005* (2013.01); *F01M 2013/0027* (2013.01); *F01M 2013/0438* (2013.01); *F16N 21/00* (2013.01); *H01R 9/16* (2013.01)

(58) Field of Classification Search
CPC ................... F01M 13/04; F01M 13/00; F01M 2013/0027; F16L 25/01; H01R 13/005
See application file for complete search history.

(56) References Cited

U.S. PATENT DOCUMENTS

| | | | |
|---|---|---|---|
| 4,321,121 | A | 3/1982 | Gurske |
| 4,922,882 | A | 5/1990 | Topfer |

(Continued)

FOREIGN PATENT DOCUMENTS

| | | |
|---|---|---|
| DE | 2432782 A1 | 1/1976 |
| DE | 19518712 A1 | 11/1996 |

(Continued)

OTHER PUBLICATIONS

International Search Report for PCT/EP2014/060050 dated Sep. 15, 2014 (8 pages).

(Continued)

*Primary Examiner* — Kevin A Lathers
(74) *Attorney, Agent, or Firm* — Bejin Bieneman PLC

(57) ABSTRACT

Disclosed is a blow-by device comprising a connection piece and a coupling piece that can be connected to each other. A ring is provided on which a connector collar for a connector is provided in order to establish an electrical connection in connection pieces that are connected to the coupling piece. The ring may be positioned on the connection piece.

15 Claims, 14 Drawing Sheets

(51) Int. Cl.
    *H01R 9/16*    (2006.01)
    *F16N 21/00*   (2006.01)

(56) References Cited

U.S. PATENT DOCUMENTS

| | | | | |
|---|---|---|---|---|
| 8,894,428 B2* | 11/2014 | Cecchinelli | ............. | F16L 25/01 |
| | | | | 439/191 |
| 2002/0016102 A1* | 2/2002 | Saba | ................... | F01M 13/022 |
| | | | | 439/188 |
| 2004/0231651 A1* | 11/2004 | Wade | ................. | F01M 13/0011 |
| | | | | 123/573 |
| 2008/0099000 A1* | 5/2008 | Suzuki | ............... | F01M 13/0011 |
| | | | | 123/574 |
| 2009/0229584 A1 | 9/2009 | Asanuma | | |

FOREIGN PATENT DOCUMENTS

| | | |
|---|---|---|
| DE | 102010020844 A1 | 11/2011 |
| EP | 1314869 B1 | 11/2004 |
| EP | 1375997 B1 | 1/2005 |
| EP | 1164264 B1 | 11/2005 |
| EP | 2236780 A1 | 10/2010 |
| EP | 2418361 A2 | 2/2012 |
| WO | 9947805 A1 | 9/1999 |

OTHER PUBLICATIONS

Search Report from German Patent Office for DE 10 2013 105 131.6 dated Jan. 30, 2014 (4 pages).

* cited by examiner

BLOW-BY DEVICE

CROSS-REFERENCE TO RELATED APPLICATIONS

This application is a national stage of, and claims priority to, Patent Cooperation Treaty Patent Application No. PCT/EP2014/060050, filed May 16, 2014, which claims priority to German Application NO. DE 10 2013 105 131.6 filed on May 17, 2013, each of which applications are hereby incorporated herein by reference in their entireties.

BACKGROUND

The disclosure relates to a blow-by device of an internal combustion engine comprising an inlet-sided connection socket that can be releasably connected to a coupling piece to which a blow-by line is connected.

A blow-by device of such a type is outlined in documents EP 1 164 264 B1 and EP 1 375 997 B1 of Applicant. Accordingly, during the operation of an internal combustion engine the crankcase, on account of leaks in the region of the piston seal, is filled with combustion gases that mix with oil vapors and generally are referred to as blow-by gases. By the stroke of the pistons of the internal combustion engine pressure is additionally applied to those blow-by gases, resulting in a pulsating volume flow. As the volume flow includes noxious hydrocarbon compounds and moreover is comparatively high—even with an optimum sealing of the piston rings the blow-by gas volume flow may amount to approximately 0.5 to 2% of the total gas volume flow—measures are required in order to prevent those gases from escaping into the environment.

For this purpose, it is generally known to provide for vacuum-controlled crankcase ventilation. In such ventilation the blow-by gas flowing from the crankcase is first guided over an oil separator. The blow-by gas then passes through a pressure control valve (blow-by valve) and reaches an intake passage at a feed area of the internal combustion engine for after-burning.

Frequently the oil separator is a cyclone separator from which a large portion of the oil is returned to the oil pan.

The pressure control valve preferably limits and keeps the vacuum in the crankcase constant. Upon a standstill of the engine the pressure control valve is open. In idling or coasting operation, which is characterized by a vacuum in the suction pipe and little blow-by gas, the pressure control valve is closed. When the load is higher, more blow-by gas occurs and the pressure control valve is opened in order to maintain the negative pressure approximately constant.

A problem exists in that particularly at low ambient temperatures hot blow-by gases encounter the cold suction air, resulting in condensation in the feed area due to a rapid cooling down in the area where the two gas flows are joined, which may lead to icing in this area. Likewise, icing in the area of the pressure control valve is possible. In order to avoid such icing in components through which blow-by gas flows, they are heated up via a heater. Solutions of that kind are already described in DE-AS 24 32 782, EP 1 314 869 B1, and DE 195 18 712 A1. Those heaters may be implemented, e.g., as conventional electric heaters. The prior art initially mentioned proposes to make use of PTC resistive elements as heating elements.

The heating of blow-by gases or of components through which those blow-by gases flow is also known from documents U.S. Pat. No. 4,922,882 and U.S. Pat. No. 4,321,121.

A problem of all of these solutions consists in that e.g. during maintenance work on the engine it may be forgotten to re-connect all of the fluid lines, particularly the blow-by line that connects the crankcase and the intake passage. For example, the connection between intake passage and blow-by heater or the connection between the crankcase and the aforementioned heater, which is usually formed by a tube, thus may not be made. On account of such accidental separation the blow-by gas volume flow is released to the environment—this is to be avoided with regard to possible environmental pollution. For the functioning of the internal combustion engine it also is problematical that the suction side of the internal combustion engine then sucks in "false air" and the engine management can no longer work in an exhaust gas optimized manner.

To overcome such a disadvantage EP 2 418 361 A2 proposes to execute the blow-by device with an electrically conductive unit contacted by way of an electric connector. The contacts may only be established if all fluid lines are connected mechanically in a predetermined manner.

To realize this, in the known solution, a connector collar for receiving a connector is formed on a coupling piece, insertion of the connector only being possible if a blocking element is moved to a release position. In an example, this adjustment of the blocking element is performed by a carrier on the coupling piece, the carrier being only in engagement with the blocking element if the fluid connection is established properly.

A disadvantage of such a solution is that considerable effort with regard to the configuration of the device is required in order to form a connector collar, a carrier and the blocking element on the coupling piece and an associated connecting piece. Furthermore, the connector is inserted crosswise to the axis of the fluid line, so that also the effort in assembling the device is considerable.

Moreover, solutions are known in which the sucking of "false air" is detected by an airflow sensor, so that the signal of the airflow sensor is indicative of a mechanical connection in the area of the blow-by device that is not properly made. Solutions of that kind, however, may only be used in lines with a comparatively large cross-section.

DE 10 201 0 020 844 discloses a method for controlling the blow-by function of an internal combustion engine. The blow-by device has a heater for heating the blow-by gases. In so doing, the power consumption of the heating elements is monitored and in case of a deviation of the power consumption from a predefined characteristic, it is concluded that blockage has occurred or a connection is not properly formed.

Such a solution requires considerable control effort.

SUMMARY

In contrast, a blow-by device is disclosed in which the blow-by gas flow path may be checked for its proper function using simple mechanisms.

The blow-by device includes the features of claim 1.

Advantageous further features of the invention are subject of the sub-claims.

The blow-by device has an intake-side connection socket that is releasably connected to a coupling piece to which a blow-by line is connected. The connection between the coupling piece and the connection socket is secured by a securing ring. A ring that can be attached to the connection socket is provided, the ring carrying a connector collar for seating a connector that closes an electric contact in the connection socket connected with the coupling piece. Such a ring may be positioned, for example, in an upgradeable manner to suitable connection sockets, the connection socket not requiring any changes. This is an essential advantage as compared to the solutions outlined at the beginning in which extensive changes had to be provided for on the connection socket or on the coupling piece in order to form the seating for a connector. The solution in accordance with the disclosure thus makes it possible to improve the reliability of a blow-by device at very low effort with regard to the configuration and assembly of the device.

In an example, an actuating element is formed on the ring that, in introducing the securing ring into its securing position, is actuated and, in so doing, shifts electrical contacts in a direction of their contact position with the connector.

Those contacts may be formed, for example, by a spring element that is pre-stressed in an interrupting direction of the contact.

As an example, such a spring element may be formed with at least one support leg that is supported on a case cover or the like.

As another example, the spring element may be executed as a leaf spring element received in a case in which also the actuating element is guided in a sliding manner and which is positioned approximately at a tangent to the ring.

The connection between connection socket and ring is particularly simple if the ring is locked in place with the connection socket.

Assembly security may be further improved if the ring has at least one guide element for positioning the securing ring, so that the two structural elements may be brought into engagement with one another only at a predetermined relative position.

Adjusting the actuating element may be performed by way of an end surface portion of the securing ring that may be brought into abutment to a carrier of the actuating element that protrudes approximately perpendicular to the adjustment direction.

The blow-by device may be realized in a particularly compact manner if the adjustment direction of the actuating element runs approximately parallel to an axis of the connection socket.

It also is advantageous to position the connector in parallel to the axis of the connection socket.

As another example, the securing ring may be formed with a guiding sleeve for the connector that may be brought into a position so as to overlap with the connector collar when forming a connection.

A contact bridge may be provided in the connector collar that closes the contact through the plugging in of the connector. This alternative thus is distinguished from the alternative described initially in that forming connections occurs by inserting the connector, whereas in the example indicated initially forming connections is only possible if, via the actuating element, the electric contacts are moved in the direction of a contact position with the connector.

In the second example it is preferred that the connector is pre-mounted in the guiding sleeve of the securing ring.

Through forming the connections, an electrical connection to a blow-by heater or a detector may be established. Based on establishing the electric connection, a control signal may be output from which can be seen that the blow-by device is "plugged-in".

Such a blow-by heater may be formed within the area of the connection socket or of the coupling piece.

SUMMARY OF THE DRAWINGS

Examples of blow-by devices are explained in more detail with reference to the schematic drawings in which.

DESCRIPTION

As was previously discussed, it is generally known to connect the crankcase of an internal combustion engine via a blow-by line with the intake passage, e.g. a pure air pipe, before an exhaust gas turbocharger, so that the blow-by gases are removed from the crankcase and are mixed with the intake air. Usually, a pressure control valve is provided in the blow-by line that in an idling or coasting operation of the engine blocks the blow-by line. The amount of oil contained in the blow-by gas is separated via an oil separator, e.g. a cyclone separator, and is returned to the oil circuit via an oil return channel. In order to avoid the problems of icing the area in which the blow-by line leads into the intake passage is heated by a blow-by heating device that in the following is not illustrated in more detail.

Figure 1:
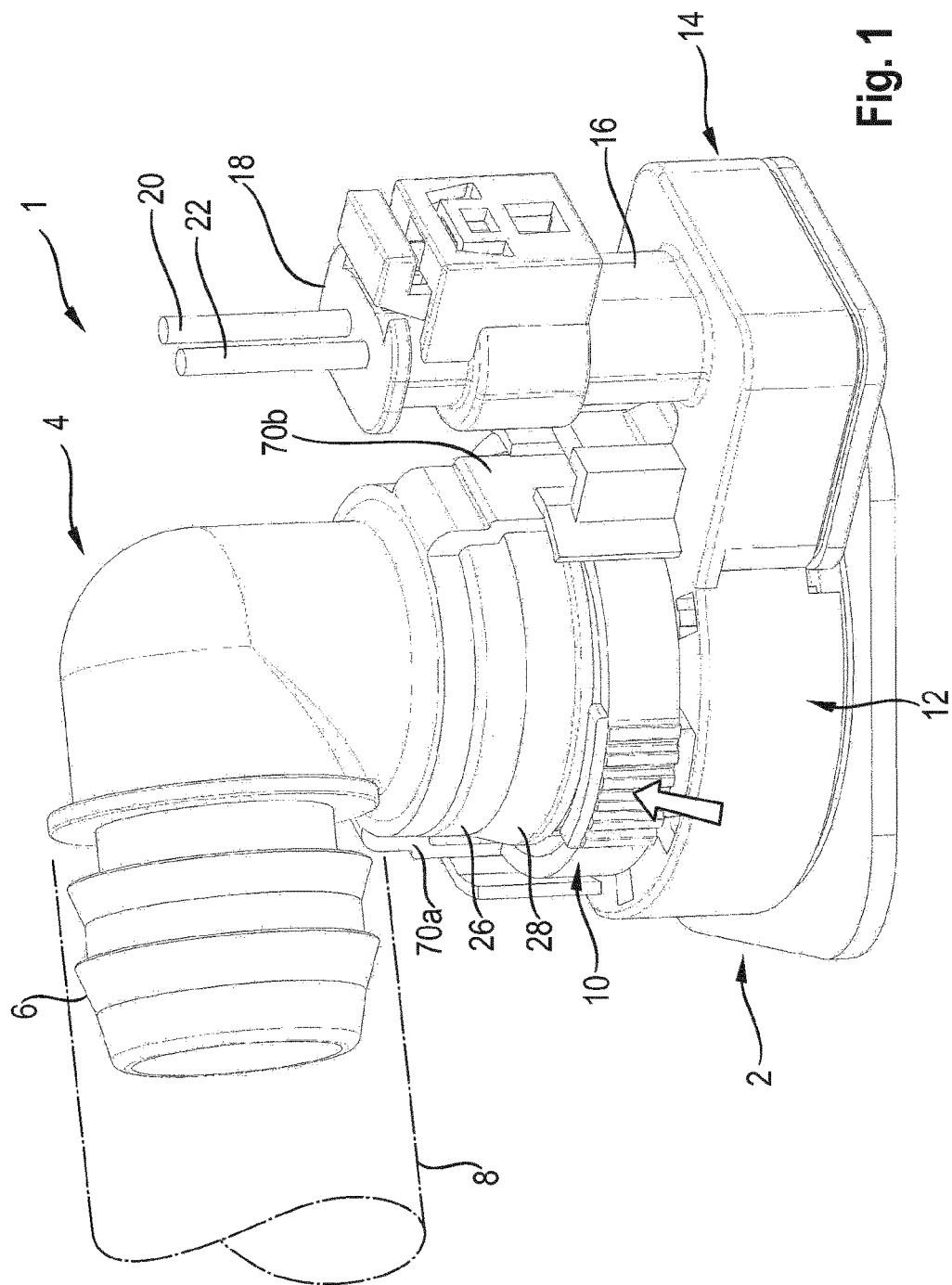
FIG. 1 is a three-dimensional representation of a first example of a blow-by device.

FIG. 1 is a three-dimensional representation of a blow-by device 1 including a suction-side connection socket 2 on which a coupling piece 4 is positioned. The coupling elements on the side of the connection socket and on the side of the coupling piece are executed in an appropriate manner, as is known. For example, a coupler of the firm Norma, or the like may be used. In the embodiment shown, the coupling piece 4 is formed with a deflection of 90°, a cone-shaped connection 6 being formed on an end portion away from the connection socket 2 to which a blow-by line 8 shown dashed can be connected. The blow-by line is usually formed in a flexile manner by way of a corrugated pipe or a tube that is pushed onto the connection 6 and, if need be, is insulated correspondingly. Alternatively, a rigid duct may be used.

In order to avoid that the connection between connection socket 2 and coupling piece 4 becomes unfastened, a securing ring 10 is formed on the latter that, in positioning the coupling piece 4 on the connection socket 2, is brought to form-fit engagement, so that unfastening of the connection is only possible if the securing ring 10 is squeezed on both sides in the direction of the arrow (see FIG. 1). A ring 12 is positioned on the connection socket 2 that, as will be explained in more detail in the following, is locked in place with the connection socket 2 and supports a case 14. A connector collar 16 extends from the top of the case 14 toward the top of FIG. 1 for seating the connector 18. When the coupling piece 4 and the connection socket 2 are connected properly and the connector 18 is inserted, an electric connection is provided through which, for example, the power supply to the aforementioned blow-by heater is provided, or an electric connection to a detector is established through which an electrical signal may be output to the engine control unit.

In the specific solution, the connector 18 has two power supply lines 20, 22 that can be connected electrically in the manner described below.

Figure 2:
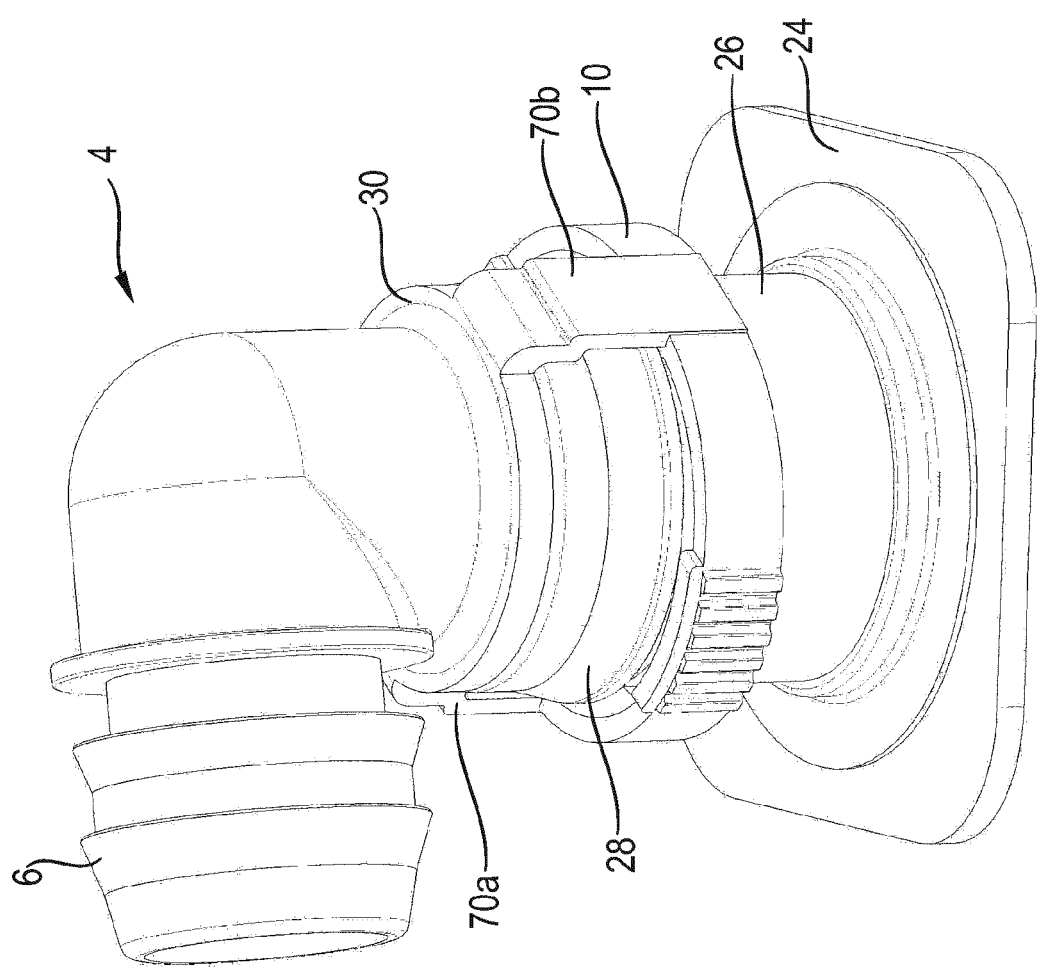
FIG. 2 shows a connection socket, a coupling piece and a securing ring of the blow-by device in accordance with FIG. 1.

FIG. 2 shows the assembly of FIG. 1 without the ring 12. Accordingly, the connection socket 2 has a base plate 24 that is fixed to an intake passage or is part thereof and from which a socket 26 extends. On its outer circumference the connecting piece has a circumferential locking shoulder 28 that in an interlocked state is gripped from behind by elements of the securing ring 10. The latter may be formed as additional components or, as in the illustrated example, in one piece with the coupling piece 4. An end portion (not shown) of the coupling piece 4 is provided with an O-ring inserted in a circumferential groove and immerses into the space encompassed by the socket 26 in a sealing manner. In an interlocked state latches of the securing ring 10 grip the locking shoulder 28 from behind, so that a positive-lock connection is provided.

Figure 3:
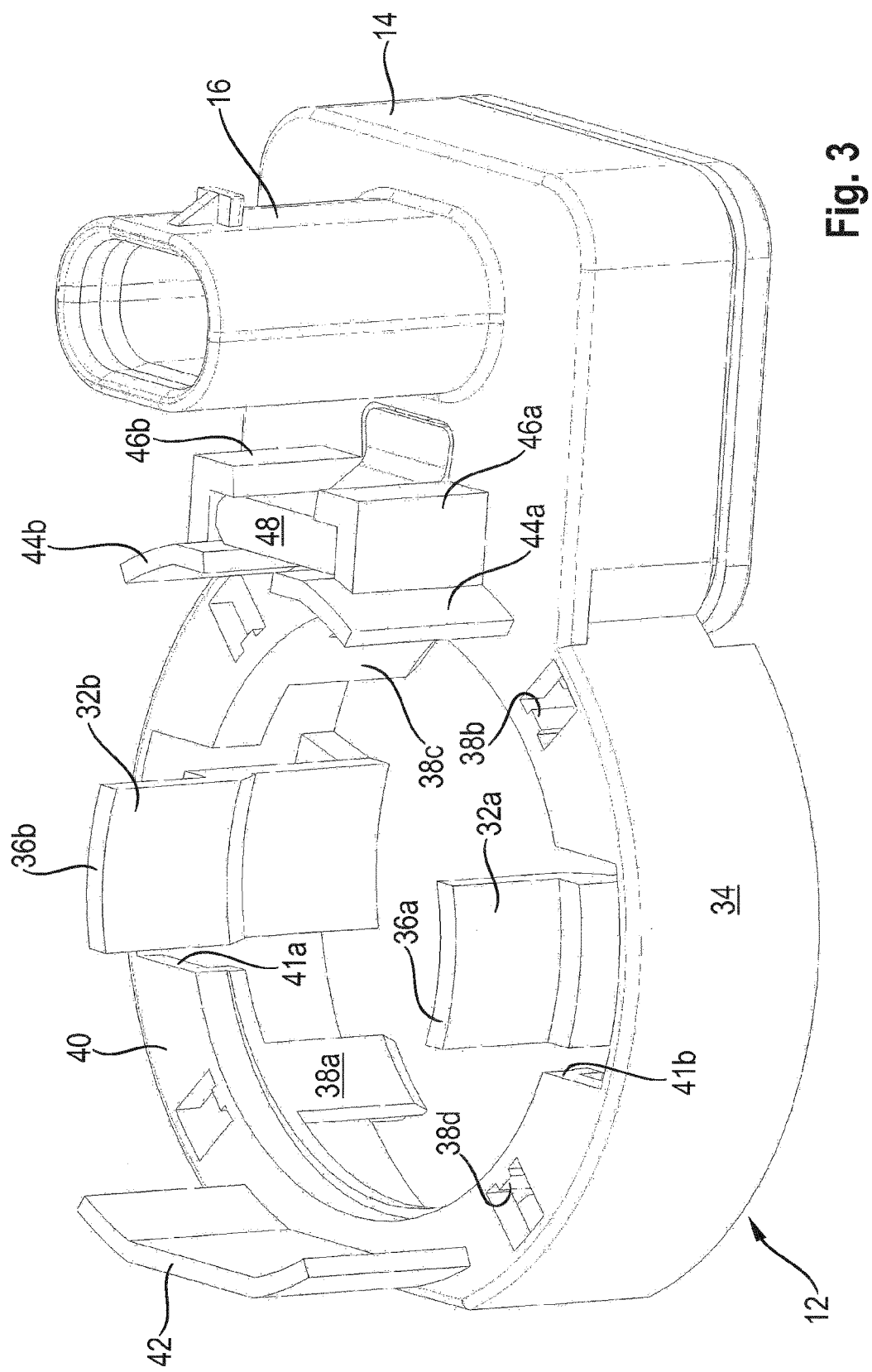
FIG. 3 is a three-dimensional plan view of a ring of the blow-by device in accordance with FIG. 1.

FIG. 3 shows the ring 12 positioned on the connection socket 2 in additional detail. One recognizes the laterally positioned case 14 including the connector collar 16 extending toward the top (view in FIGS. 1 and 3) that is formed with a connector arrangement matching the connector 18.

The ring 12 is configured so as to encompass the socket 26 below the locking shoulder 28. In the depicted example the ring 12 is made of synthetic material, the individual components being manufactured in an injection molding process. On the ring 12, two locking lugs 32a, 32b that are located diametrically to one another are formed, which are clean cut by way of sliders of the injection mold and protrude in an axial direction over a ring base body 34 to the top (FIG. 3) toward the locking shoulder 28. As will be shown later, arc-shaped curved end surface portions 36a, 36b of locking lugs 32a, 32b grip the locking shoulder 28 from below, so that the ring 12 is fixed in position on the connection socket 2. The ring 12 is supported on the side of the connection plate by four supporting lugs 38a, 38b, 38c, 38d likewise clean cut by way of slider systems. In accordance with the representation in FIG. 3 the ring base body 34 is executed with a cover ring 40, supporting lugs 38 spread on the periphery extending in extension of an inner end surface. In accordance with the representation in FIG. 3, the supporting lugs 38a, 38b, 38c, 38d are located so as to be offset from the locking lugs 32a, 32b. The recesses that join the front side in the cover ring 40 are required for the sliders for forming supporting lugs 38a, 38b, 38c and 38d.

On the top end surface of cover ring 40 wall portions 42, on the one hand, and wall portions 44a, 44b, on the other hand, are formed that are opposite to one another and lie on a diagonal that is approximately at right angles to the diagonal of the two locking lugs 32a, 32b. The cover ring 40 has two recesses 41a, 41b through which the locking lugs 32a, 32b extend that are attached to the inner peripheral surface of ring base body 34.

Wall portions 42, 44a, 44b that, among other things, serve for alignment of the securing ring 10, so that the latter can only be mounted at a predetermined relative position with regard to ring 12.

A rear-side guide 46a, 46b is executed on both wall portions 44a, 44b, along which an actuating element 48 is guided in a sliding manner. The guide is formed so as to enable adjustment of the actuating element 48 parallel to the axis of the connector and to the axis of ring 12.

Figure 4:
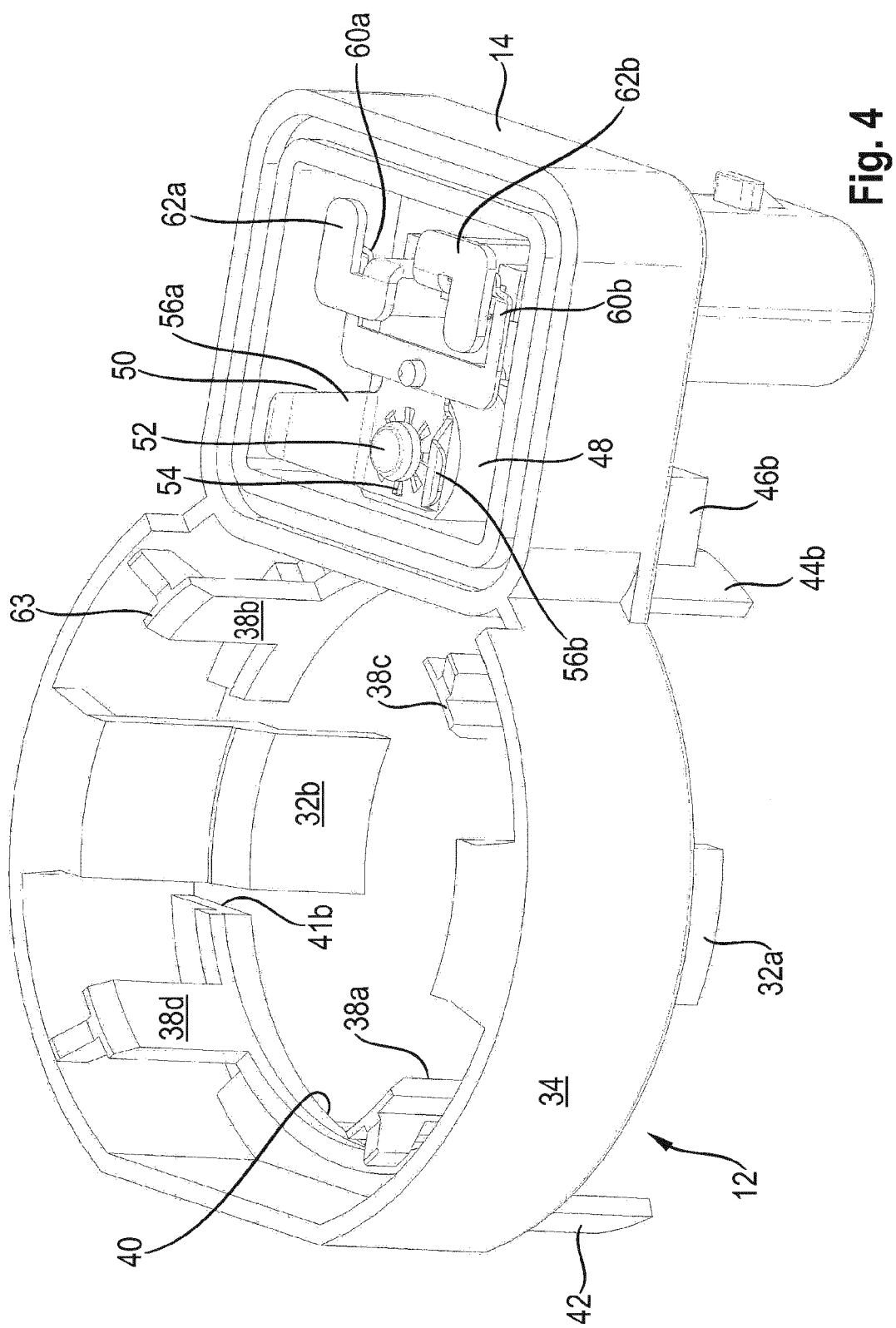
FIG. 4 is a bottom view of the ring in accordance with FIG. 3 with the case opened.

FIG. 4 is a bottom view to the ring 12 with the case 14 in an open state. In this representation, wall portions 42 and 44b, locking lugs 32a, 32b that in this view extend toward the bottom, as well as the four supporting lugs 38a, 38b, 38c and 38d distributed around the periphery may be seen, the latter extending toward the top (view in accordance with FIG. 4) out of the cover ring 40 and supported sideways on the inner peripheral surface of the ring base body 34.

The case 14 is depicted with the bottom that will be explained in more detail in the following, being removed. In the representation, a leaf spring element 50 may be seen that is connected to actuating element 48. The latter has a connecting pin 52 that penetrates through a terminal recess 54 of a leaf spring element 50.

In an area attached to the terminal recess 54 the leaf spring element 50 is formed with two V-shaped support legs 56a, 56b that are supported on the bottom of the case 14 (not shown) and thus pre-stress the actuating element into a basic position. Spaced apart from the two support legs 56a, 56b the leaf spring element 50 branches off to two bent contact legs 60a, 60b, the end portions of which are angled upwardly, in the direction of the two contacts 62a, 62b. In the depicted basic position the contact legs 60a, 60b are spaced apart to contacts 62a, 62b that in turn are connected to power supply lines 20, 22, i.e. the electric connection between the power supply lines 20, 22 is interrupted in the basic position depicted in FIG. 4.

Figure 5:
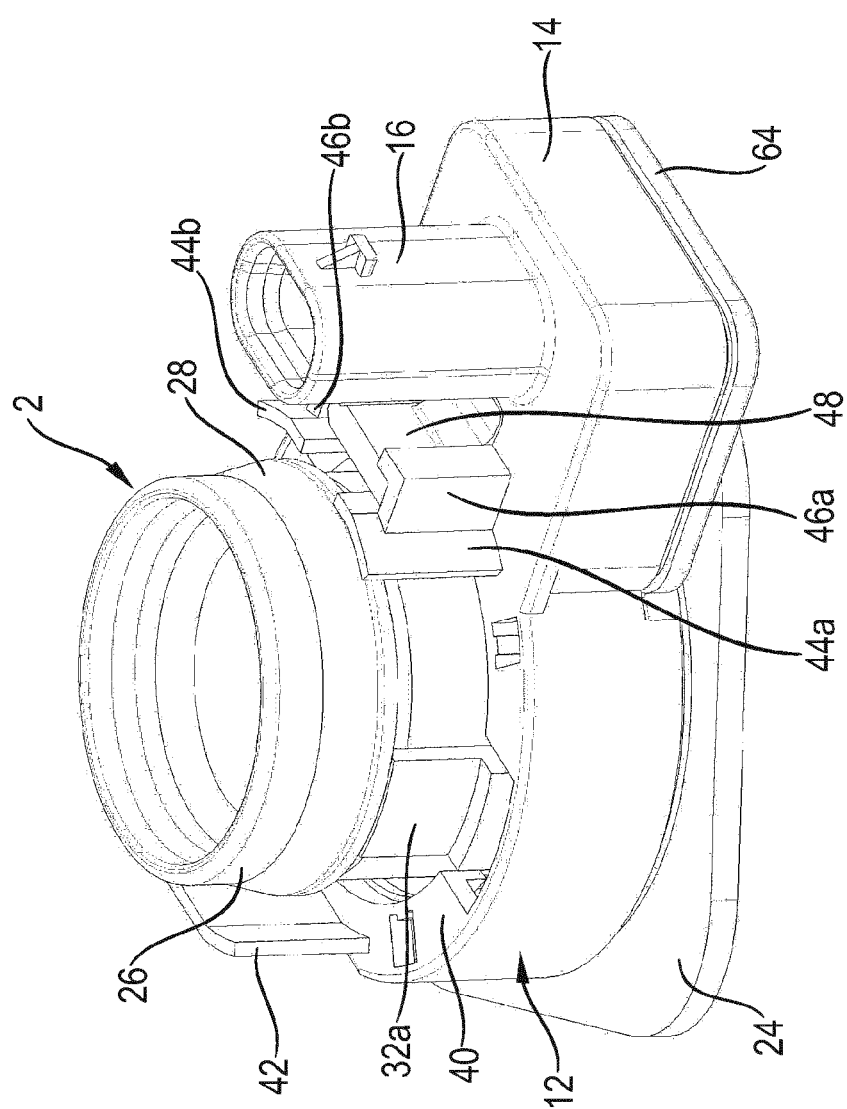
FIG. 5 shows the ring in accordance with FIGS. 3 and 4 in a state in which it is positioned on the connection socket.
Figure 6:
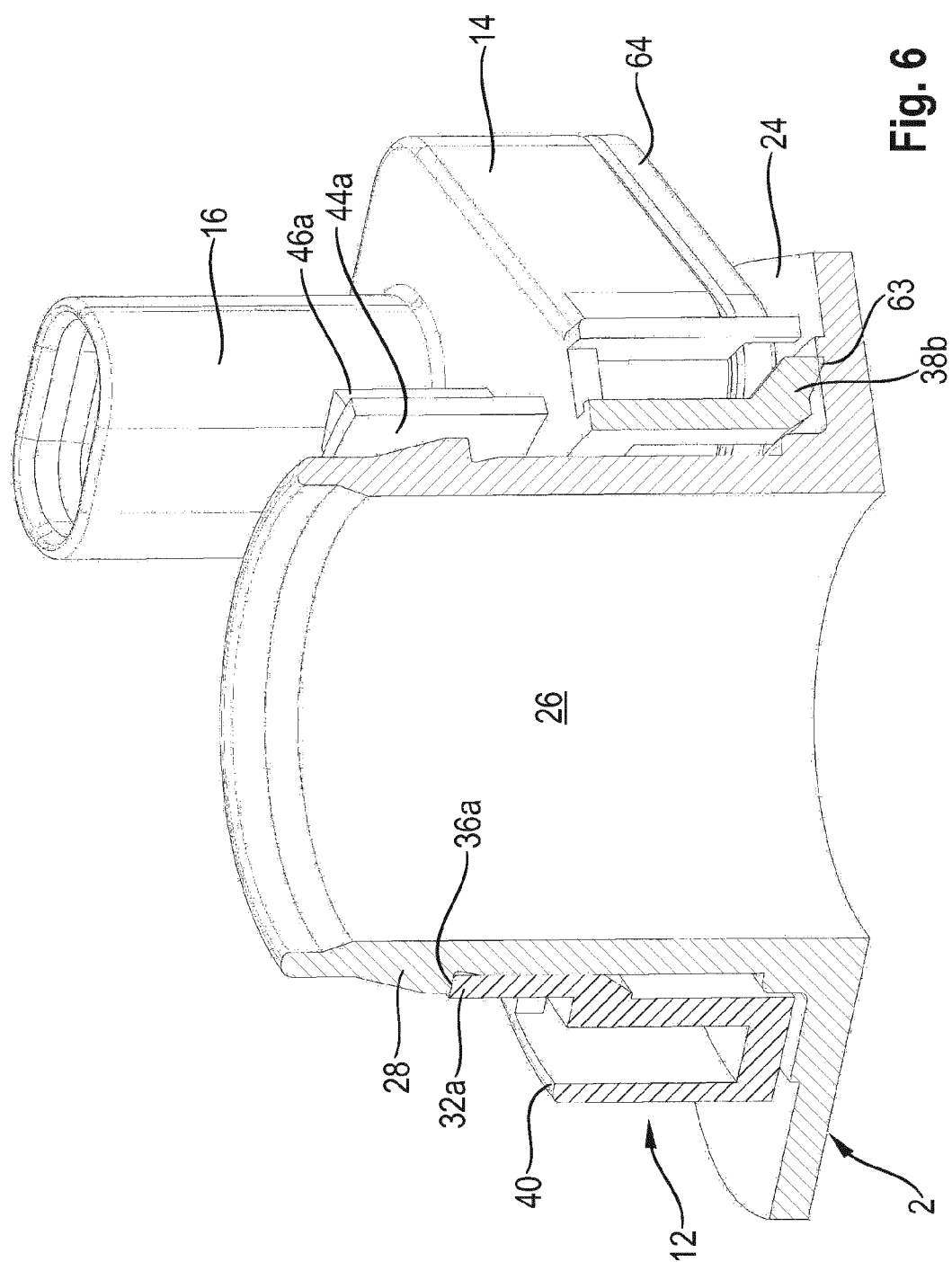
FIG. 6 is a cross-sectional view of the assembly in accordance with FIG. 5.

FIG. 5 shows the ring 12 being positioned on the connection socket 2 in accordance with FIGS. 3 and 4. The two locking lugs 32a, 32b (the latter not being visible) grip the circumferential locking shoulder 28 from below, the ring 12 being supported on the base plate 24 via the supporting lugs 38 spread on the periphery. This becomes particularly clear from the sectional representation in accordance with FIG. 6. The section is made such that, on the one hand, the locking lug 32a gripping the locking shoulder 28 from below may be seen, the end surface portion 36a of which is in contact with the lower radial peripheral edge of the locking shoulder 28. On the other hand, in the sectional representation also the supporting lug 38b may be seen that, with the inclined front side 63, is supported on base plate 24, so that the ring 12 is fixed in position. In the representations in accordance with FIGS. 4 and 5 the addressed bottom 64 of case 14 is mounted, the two support legs 56a, 56b being supported on an inner surface of the bottom 64 and pre-stressing the actuating element 48 into its basic position in accordance with FIG. 5.

Figure 7:
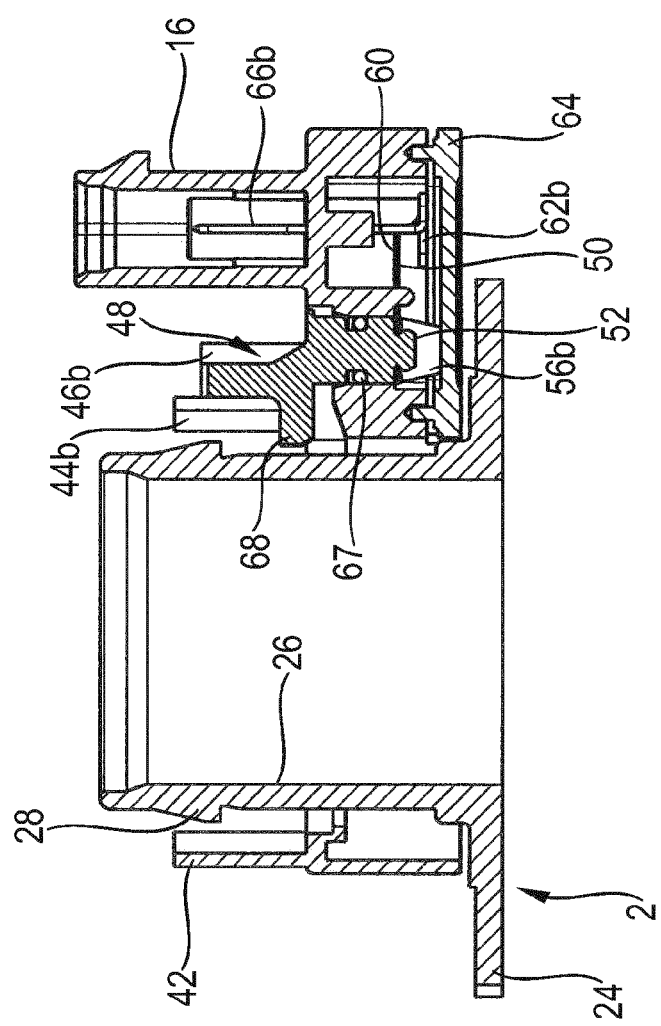
FIG. 7 is a further cross-sectional view with a sectional plane running through an actuating element.

FIG. 7 is a further cross-sectional view of the assembly in accordance with FIG. 5, the section line being such that the actuating element 48 is visible. In the representation, wall portions 42 and 44b are to be seen as well as part of the guide 46b for actuating element 48. As was explained above, the latter includes the pin 52 through which the leaf spring element 50 is defined. Also visible is contact 62b that extends into the connector collar 16. In the representation in accordance with FIG. 7 the end section of contact 62 is provided with reference numeral 66b. In accordance with FIG. 7 spring leaf element 50 with its contact legs 60 is spaced apart to the two contacts 62a, 62b, so that the electric connection is interrupted. The two support legs 56a, 56b, of which only the support leg 56b is visible in FIG. 7, are supported by the bottom 64. For sealing purposes, the actuating element 48 is additionally provided with an O-ring 67. Furthermore, the actuating element 48 has a carrier 68 extending toward the socket 26 in a radial direction, which extends into the area below the locking shoulder 28 up to shortly before the external circumferential surface of socket 26.

Figure 8:
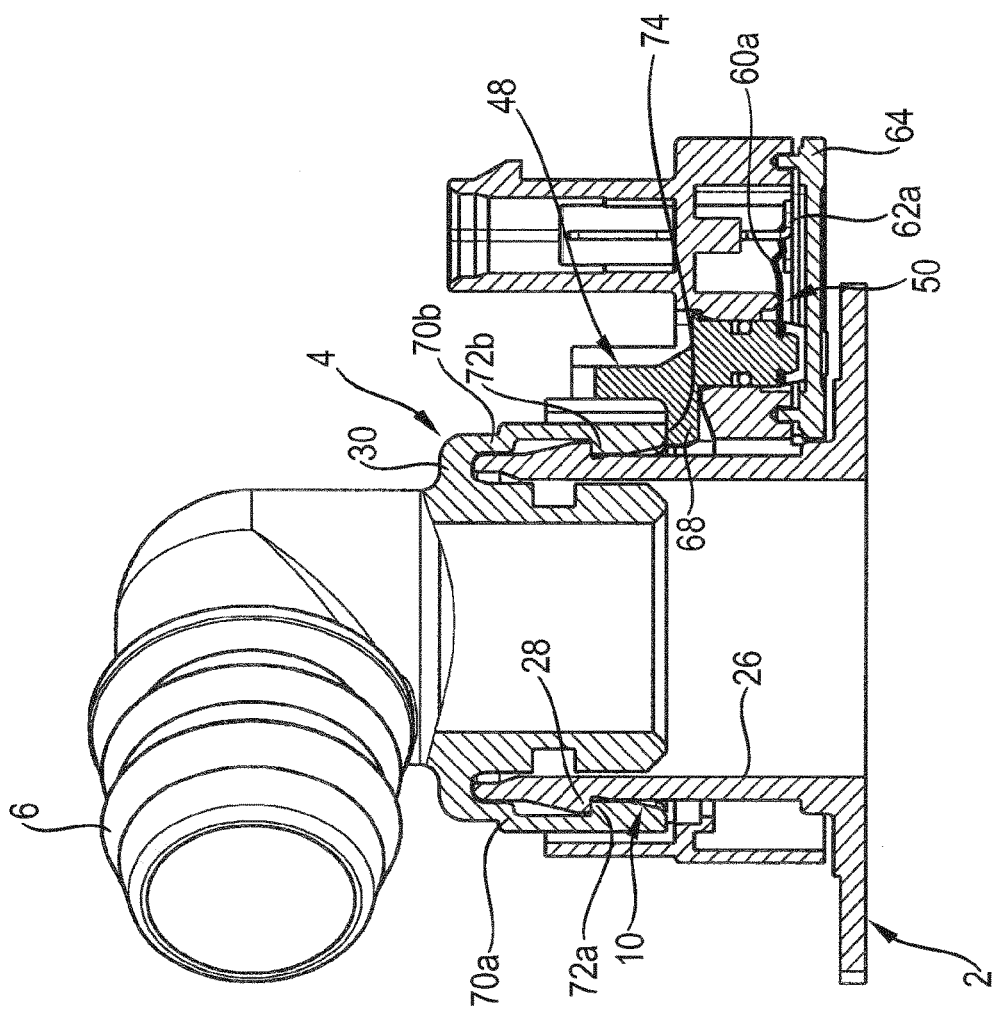
FIG. 8 is a cross-sectional view in accordance with FIG. 7 with the actuating element being adjusted and the coupling piece being positioned.

FIG. 8 shows the assembly in accordance with FIG. 7 with coupling piece 4 fixed in place. As was explained above, the coupling piece 4 is formed with a securing ring 10 that is connected with the coupling piece 4 via two resilient holding arms 70a, 70b (also see also FIG. 1). The holding arms 70a, 70b, in the representation in accordance with FIG. 2 are connected to and extend from the circumferential shoulder 30 with which the coupling piece 4 is fixed in place on the end surface of connection socket 2. Circumferential securing ring 10 has at least two latches 72a, 72b that in their shown locking position grip the circumferential locking shoulder 28 from below, so that the coupling piece 4 is locked with respect to the connection socket 2 both in an axial direction and in a radial direction. Upon fixing the coupling piece 4 in place, an end surface portion 74 of the securing ring 10 comes into contact with carrier 68, so that the actuating element 48 is moved downwards against the force of leaf spring element 50 in the direction of bottom 64 and the two contact legs 60a, 60b, of which only contact leg 60a is visible in FIG. 8, come into contact with associated contacts 62a, 62b, so that both contacts 62a, 62b are contacted electrically, thus establishing an electric connection between the contacts. As described above, electric contacting is performed against the force of the two V-shaped support legs 56a, 56b adjusted to one another and supported on the bottom 64.

Figure 9:
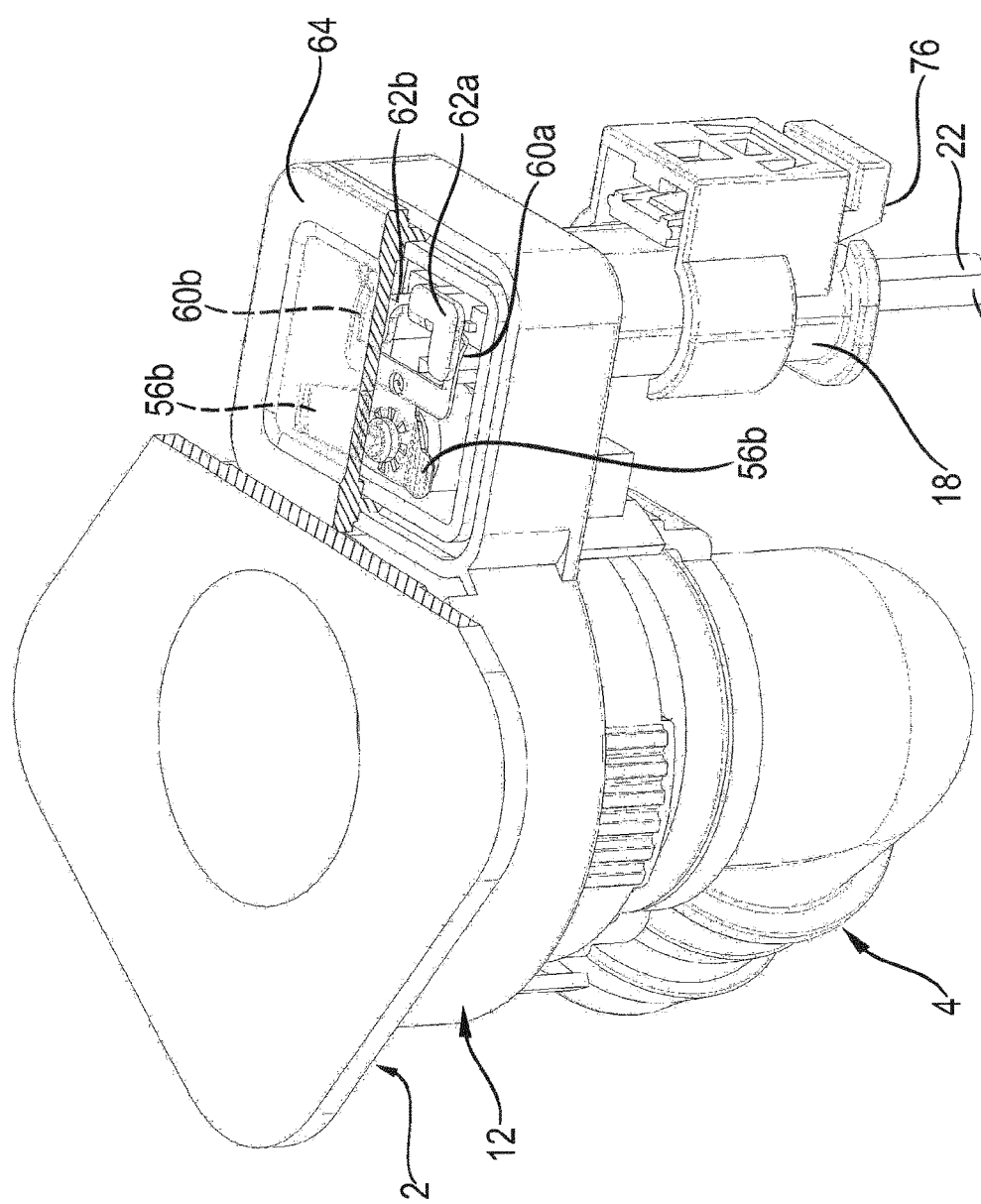
FIG. 9 is a representation corresponding to FIG. 4 with the actuating element being actuated and with closed contacts.

FIG. 9 is a view corresponding to FIG. 4 including electrical connections. The support of the two support legs 56a, 56b on the bottom 64 (only shown in half) may be seen and the contact legs 60a, 60b that in this position are in contact with contacts 62a, 62b. In the representation in accordance with FIG. 9 also the connector 18 is inserted, the latter being provided with a securing element 76 to avoid that the connector 18 is removed accidentally. In case of a properly plugged connection between the connection socket 2 and the coupling piece 4 an electric connection between the two power supply lines 20, 22 is established, so that a blow-by heater or else a detector for outputting a signal "plug connection established" can be controlled correspondingly.

In the example described above an additional ring 12 is used in order to establish a plug connection for the blow-by device 1 with a conventional coupling piece 4 and a connection socket 2, electrical contact within the ring 12 only being possible in case of a proper plug connection.

By way of FIGS. 10 to 13 an alternative is explained in which electrical connections are formed essentially via connector 18, which, however, can only be inserted in case the plug connection is established properly. The basic structure of connection socket 2 and coupling piece 4 corresponds to the example explained above, this time also securing ring 10 being manufactured as a separate component. This would also be possible in the example described above. In the alternative configuration in accordance with FIG. 10, the connector collar 16 for connector 18 is positioned to the ring 12 that in turn is positioned on the connection socket 2. In this alternative, the securing ring 10 is executed with a guiding sleeve 78 for the connector 18, so that the latter can only be inserted if the guiding sleeve 78 is aligned with respect to connector collar 16. In accordance with the invention, such alignment is only provided in case of a proper plug connection between the connection socket 2 and the coupling piece 4. In mounting the unit the connector 18 is first inserted into the guiding sleeve 78, thus forming an assembled unit.

Figure 11:
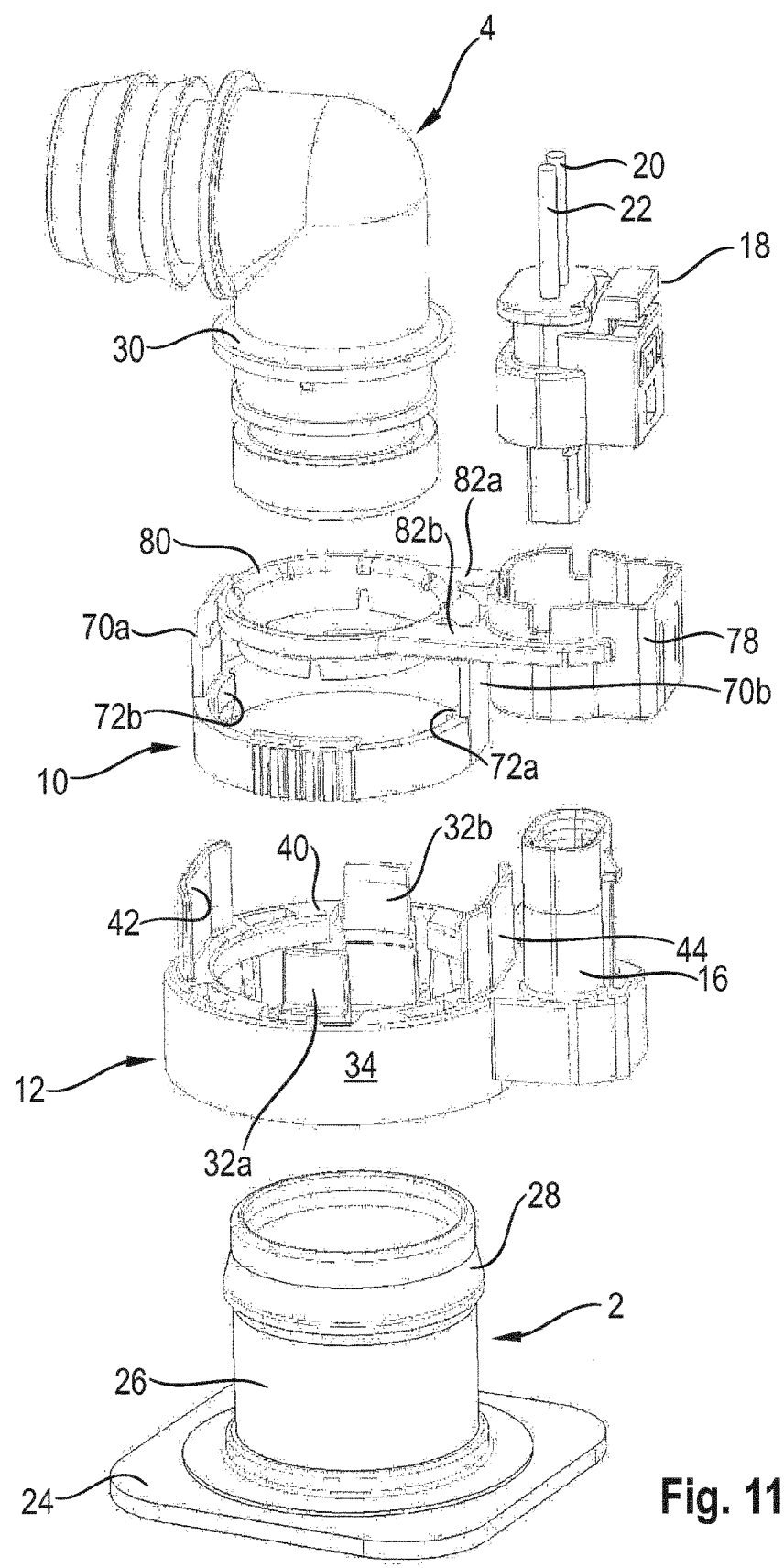
FIG. 11 is an exploded view of the blow-by device in accordance with FIG. 10.

The individual structural components of the second example are shown in FIG. 11. In the representation the connection socket 2 and the angular coupling piece 4 can be seen, the basic structure of which corresponds to the respective components of the embodiment described before. The connector 18 in turn is provided with power supply lines 20, 22 that in case of a proper connection are connected electrically. As explained above, the securing ring 10 in the example is executed as a separate structural component, but basically it is also possible to form the securing ring in one piece with the coupling piece 4.

In the alternative shown, the securing ring 10 has two latches 72a, 72b that are spread on its inner circumference. In a locking state, the latches grip the locking shoulder 28 of the connection socket 2 from below. On the actual securing ring 10 again two holding arms 70a, 70b are formed that extend axially parallel upwards (view in accordance with FIG. 11) and carry a holding ring 80 that in a mounting position is in contact with the support shoulder 30 of coupling piece 4. Guiding sleeve 78, in which the connector 18 can be pre-assembled, is held on the holding ring 80 via radial supports 82a, 82b. This means that prior to establishing the connection between the connection socket 2 and the coupling piece 4 the connector 18 is already pre-assembled on the guiding sleeve 78. As in the example described above, the ring 12 is positioned on the connection socket 2, locking being performed, similar to the embodiment described above, by two locking lugs 32a, 32b that are located diametrically to one another and that in a locked state grip the locking shoulder 28 of the socket 26 from below. For guiding and positioning of the securing ring 10, wall portions 42, 44 are again provided on the cover ring 14. Laterally from the wall portions 42, 44, on the ring base body 34, the connector collar 16 is positioned, into which the connector 18 is inserted in order to establish an electrical connection. This means that by the rings 10, 12 that are provided as separate components, conventional blow-by connection elements such as, for example, a connecting piece from the firm Norma and a coupling piece 4 from the firm Norma can be added subsequently in a manner in accordance with the invention. As was already explained above, it is also possible to form the securing ring 10 in one piece with the coupling piece 4.

Figure 10:
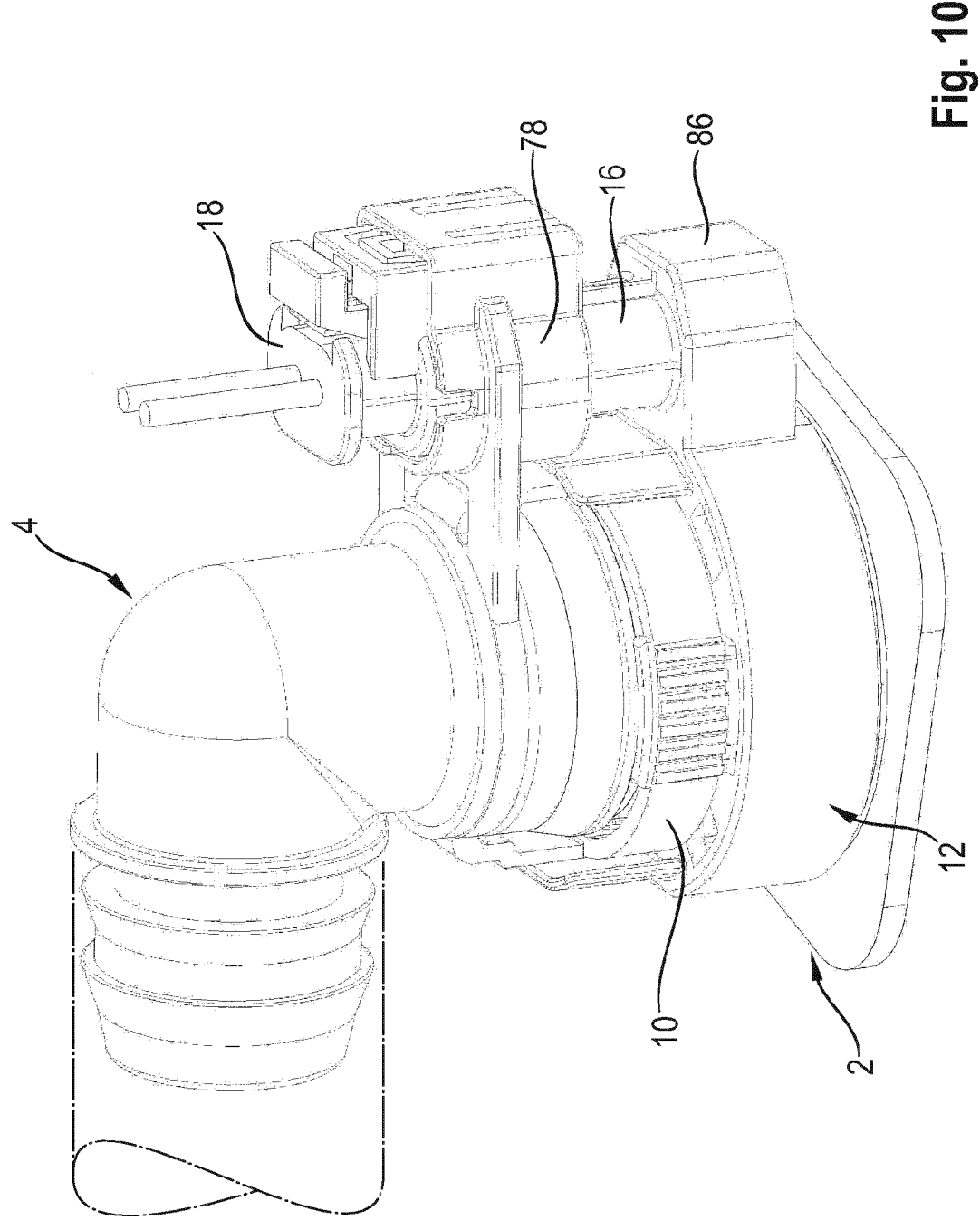
FIG. 10 is a three-dimensional representation of a further example of a blow-by device.
Figure 12:
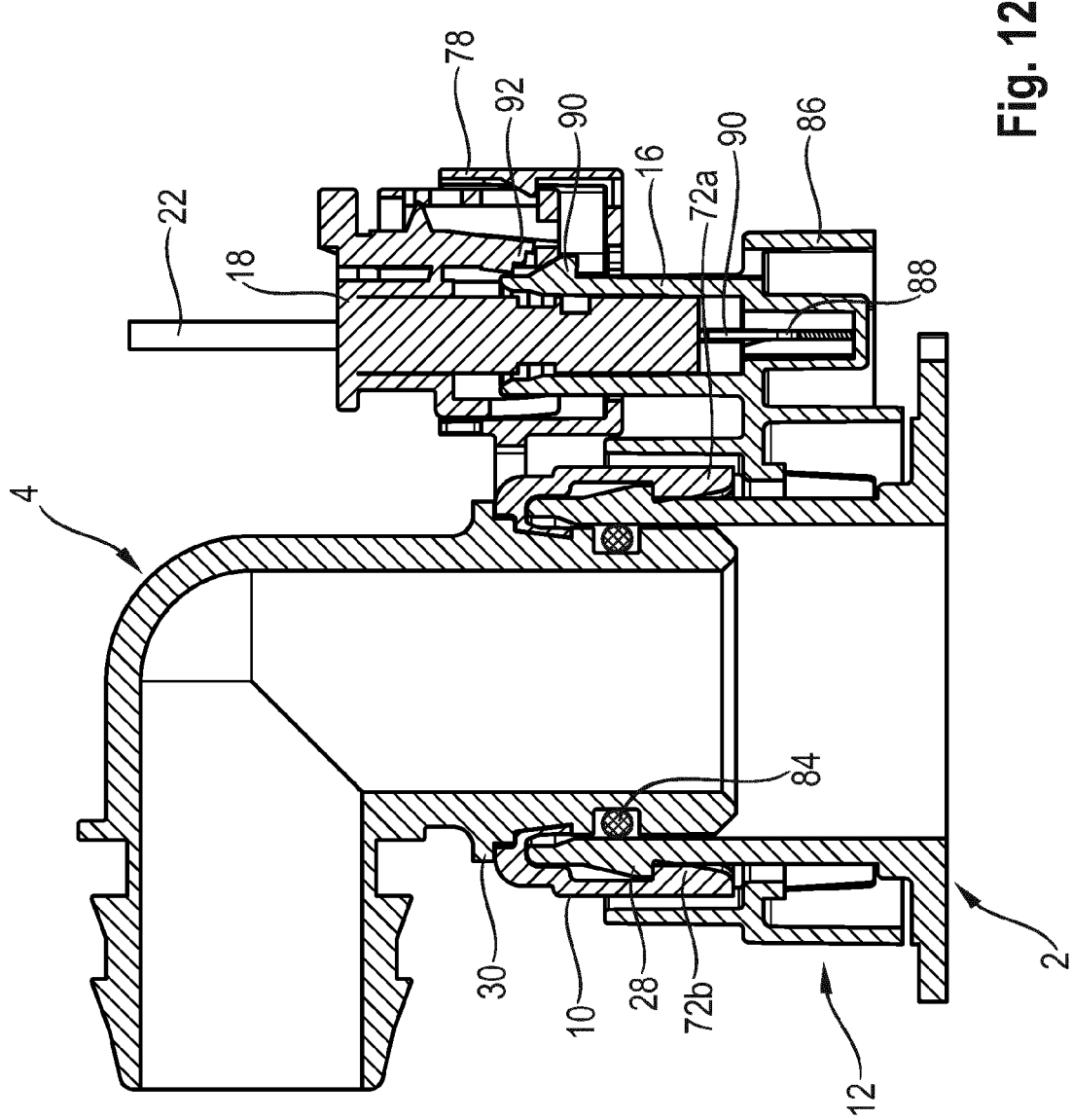
FIG. 12 is a cross-sectional view of the blow-by device in accordance with FIGS. 10 and 11 in a non-contacted state.
Figure 13:
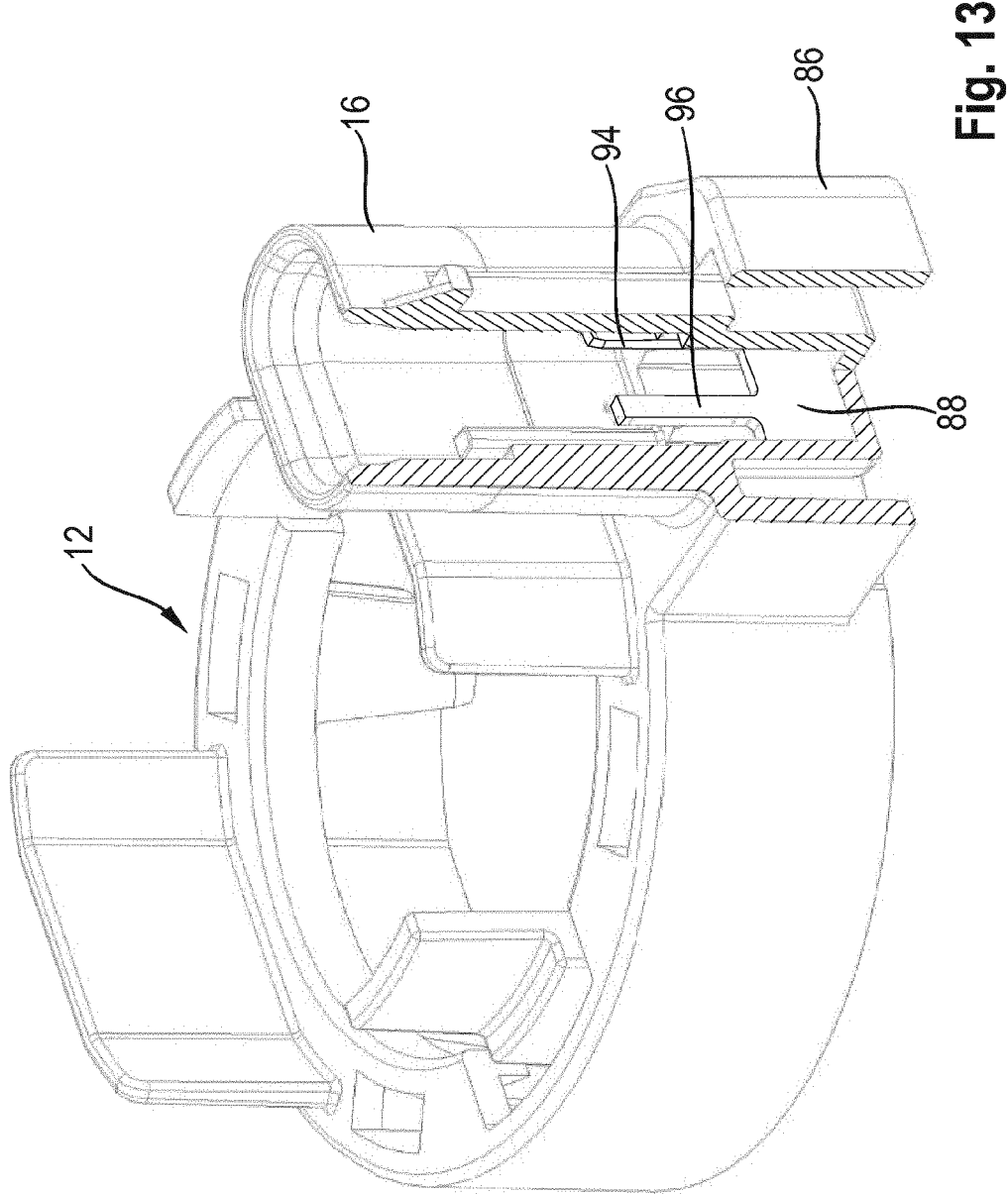
FIG. 13 is a detail drawing of a ring of the embodiment in accordance with FIG. 10.

FIG. 12 is a sectional view of the example in accordance with FIG. 10. Accordingly, the coupling piece 4 is inserted in the connection socket 2, sealing being performed, as in the embodiments described before, via an O-ring 84. The securing ring 10 on its bottom side (view in accordance with FIG. 12) is in contact with support shoulder 30, latches 72a, 72b gripping the circumferential locking shoulder 28 from behind. From the representation in accordance with FIG. 12 it can be seen that in case a plug connection is established, the connector collar 16 immerses in the guiding sleeve 78 in sections. The connector 18 is not yet shifted to its end position, but only inserted partway into the connector collar 16. In the lower section of the connector collar 16 a case section 86 is formed in which a contact bridge 88 is received that, however, is not in electrical contact with the connector 18. The contact bridge 88 (see also FIG. 13) is of approximately U-shaped structure, so that an electrical connection between the two power supply lines 20, 22 may be established. FIG. 13 is a detail drawing of the above-described ring 12 in accordance with FIG. 11 with a partly sectional view of the connector collar 16, so that the U-shaped contact bridge 88 that is embedded in the connector collar 16 and in the case section 86, respectively, becomes visible, two contact pins 94, 96 extending inwardly into the space encompassed by the connector collar 16.

Figure 14:
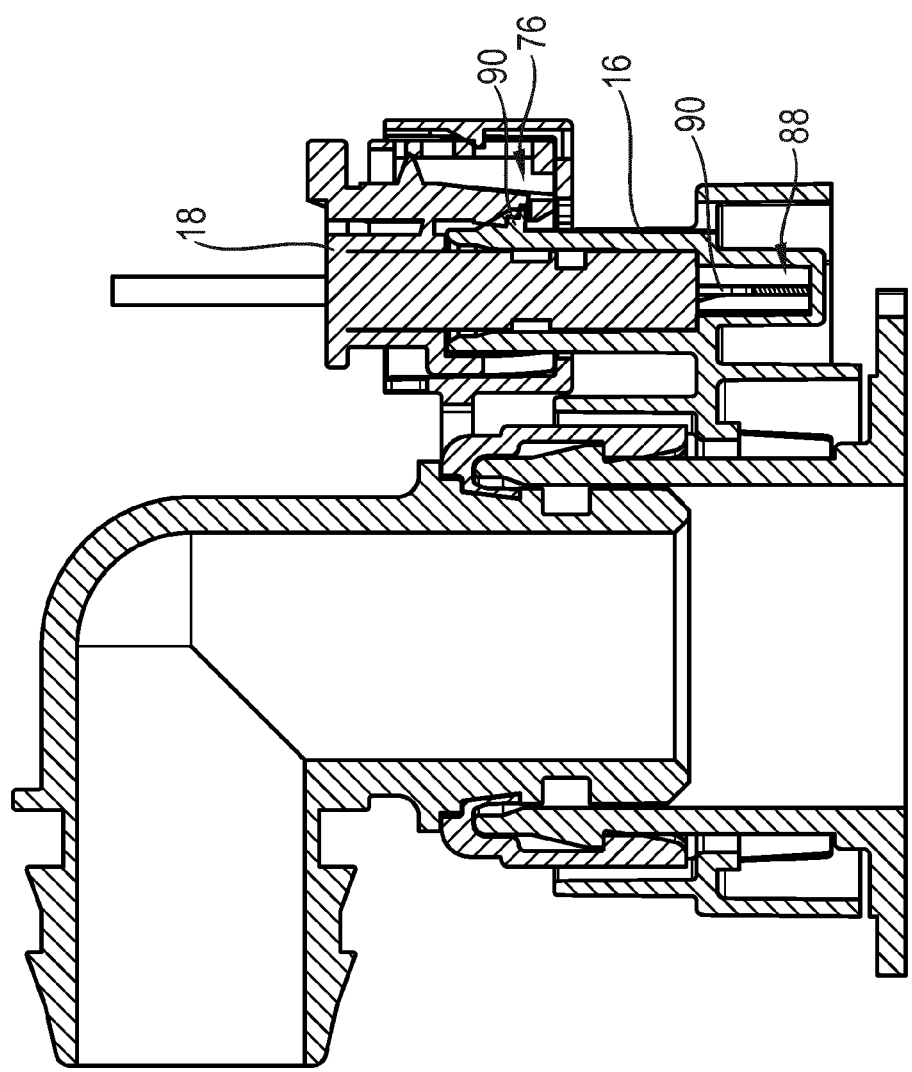
FIG. 14 is a cross-sectional view that corresponds to the view depicted in FIG. 12 in a contacted state of the blow-by device.

In accordance with FIG. 14 electrical contact is effected by fully inserting the connector 18 in connector collar 16, the contact bridge 88 then immersing in the recesses of the connector 18 and electrically connecting the two power supply lines 20, 22, so that the aforementioned detector or the blow-by heater are supplied with current. In this example, the plug position of the connector 18 likewise is safeguarded by the securing element 76, a snap-on connection being performed between the securing nib 90 of the connector collar 16 and the corresponding catching elements 92 of the connector 18.

Disclosed is a blow-by device comprising a connection socket and a coupling piece that can be connected to each other. In accordance with the invention a ring is provided on which a connector collar for a connector is provided in order to establish an electric connection. The ring may be positioned on the connection socket.

The invention claimed is:

1. A blow-by device for a combustion engine comprising:
    an inlet-side connection socket;
    a blow-by line connected to a coupling piece, the coupling piece being releasably connected to the connection socket; and
    a securing ring securing the connection between connection socket and the coupling piece; and
    a ring that can be fixed in place on the connection socket, the ring including a connector collar, wherein the connector collar seats a connector that closes an electrical contact in the connection socket.

2. The blow-by device of claim 1, further comprising:
    at least one actuating element configured such that, upon adjusting the securing ring into a securing position, the actuating element urges electric contact elements in a direction of a making contact with the connector.

3. The blow-by device of claim 2, further comprising:
    a spring element, the spring element configured such that the contact elements are urged by the spring element in a direction of breaking contact with the connector.

4. The blow-by device of claim 2, further comprising:
    a case bottom, wherein the spring element is supported on the case bottom by support legs.

5. The blow-by device of claim 4, wherein the spring element includes a leaf spring element that is disposed in a case connected to the ring, the actuating element being guided in the case.

6. The blow-by device of claim 1, wherein the ring is locked in place with the connection socket.

7. The blow-by device of claim 1, wherein the ring has guide elements for positioning the securing ring.

8. The blow-by device of claim 1, wherein the securing ring includes an end face portion, wherein the end face portion that can be brought into contact with a carrier of the actuating element, the carrier protruding substantially perpendicular to an adjustment direction.

9. The blow-by device of claim 1, wherein an adjustment direction of the actuating element runs approximately parallel to an axis of the connection socket.

10. The blow-by device of claim 1, wherein the connector is positioned in parallel to the axis of the connection socket.

11. The blow-by device of claim 1, wherein the securing ring includes a guiding sleeve for the connector, the guiding sleeve arranged such that, by connecting the securing ring to the ring, the connecting collar is in part covered by the guiding sleeve.

12. The blow-by device of claim 11, wherein the connector includes a contact bridge, such that, upon inserting the connector into the connector collar, an electrical connection is established.

13. The blow-by device of claim 11, wherein the connector is pre-mounted in the guiding sleeve.

14. The blow-by device of claim 1, wherein the contact elements establish an electrical connection to at least one of a blow-by heater and a detector.

15. The blow-by device of claim 1, further comprising a blow-by heater disposed in one of an area of the connection socket and an area of the coupling device.

\* \* \* \* \*